(12) United States Patent
Morris (10) Patent No.: US 6,901,078 B2
(45) Date of Patent: May 31, 2005

(54) METHOD AND APPARATUS FOR CONVERTING DATA STREAMS

(75) Inventor: Octavius J. Morris, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 862 days.

(21) Appl. No.: 09/749,733

(22) Filed: Dec. 27, 2000

(65) Prior Publication Data

US 2001/0007568 A1 Jul. 12, 2001

(30) Foreign Application Priority Data

Dec. 30, 1999 (GB) .............................................. 9930787

(51) Int. Cl.⁷ .................................................. H04J 3/04
(52) U.S. Cl. ........................ 370/466; 370/486; 370/535; 370/236
(58) Field of Search ................................ 370/466, 486, 370/487, 493, 535, 235, 236, 465, 395.64; 709/235; 725/148

(56) References Cited

U.S. PATENT DOCUMENTS 6,172,988 B1 * 1/2001 Tiernan et al. .............. 370/473
6,327,275 B1 * 12/2001 Gardner et al. ............. 370/535
6,567,409 B1 * 5/2003 Tozaki et al. ........... 370/395.64

FOREIGN PATENT DOCUMENTS

EP    0833514 A2   4/1998   ............ 370/395.64
JP    10243394 A   9/1998   ............ 370/395.64

* cited by examiner

*Primary Examiner*—Ricky Ngo
*Assistant Examiner*—Rchard Chang
(74) *Attorney, Agent, or Firm*—Michael E. Belk (57) ABSTRACT

A digital video recorder or similar apparatus implements a method of converting an input data stream having an MPEG-2 Program Stream (PS) format into an output data stream having an MPEG-2 Transport Stream (TS) format. The input data stream (PS) includes data of at least first and second elementary data streams (404, 406) formed and multiplexed in compliance with a PS decoder model. A scheduler (412) within the apparatus inhibits reading of a further data block from the input stream when, in the absence of a vacancy for data of an audio elementary stream within a target decoder model (418), a clock reference (SCR) of said input data stream advances beyond a clock reference of said output data stream by a predetermined waiting threshold.

27 Claims, 5 Drawing Sheets

METHOD AND APPARATUS FOR CONVERTING DATA STREAMS

The invention relates to methods and apparatuses for converting multiplexed data streams from one multiplexed format to another (transmultiplexing). The invention finds particular application for example in transmultiplexing video and audio streams from a program stream format to a transport stream format in compliance with the MPEG-2 specification (ITU-T Recommendation H.222.0|ISO/IEC 13818-1).

The MPEG-2 Standard mentioned above specifies generic methods for multimedia multiplexing, synchronisation and timebase recovery. The specifications provide a packet based multimedia multiplexing where each elementary bit stream (video, audio, other data) is segmented into a Packetised Elementary Stream (PES), and then respective packets are multiplexed into either of two distinct stream types. Program Stream (PS) is a multiplex of variable length PES packets and designed for use in error free environments, such as recording on disc. Transport Stream (TS) consists of 188 byte fixed length packets, has functionality of multiple programme multiplexing as well as multiplexing of various PES packets of one programme, and is designed for use in error prone environments such as broadcast. The multimedia synchronisation and timebase recovery are achieved by the use of time-stamps for system time clock and presentation/decoding.

Because each type of stream has its advantages and disadvantages in different circumstances, the MPEG-2 specification recognises that conversion between the two formats may be desirable. However, due to differences between the formats and particularly the "target decoder" models which define constraints as to buffer sizes, time delays, data rates and so forth, the different elementary streams cannot be scheduled in one format the same as they were in the other. It is necessary therefore to demultiplex and remultiplex the elementary stream data when converting from one type of stream to the other. There is also the factor that system information which puts a structure into PS data designed for random access, editing and the like, is generally absent from the TS broadcast.

EP-A-0 833 514 (Sony) proposes a system of recorder/player apparatus and presentation (display apparatus). The player, for example, reads PS format data from a disc and converts it to TS format for the display. On the other hand, the buffer sizes present in the embodiments thereof do not appear to account for the different constraints which require rescheduling of the different elementary streams to convert a valid PS to a valid TS format. In fact, it can be shown that the constraints imposed by the TS specification itself require a buffer for at least one second's worth of video information, and the same processing effort as would be required to make the stream from scratch.

It is an object of the invention to reduce the computational burden and/or the storage space required, when converting data streams between formats such as the MPEG program stream and transport stream. It will be understood that the invention is applicable beyond the strict confines of MPEG-2 compliant streams, as similar problems will generally arise when converting multiplexed streams between any two formats.

The inventors have recognised that, although re-scheduling is inevitable to convert from one format to the other, constraints inherent in the source format can be exploited to reduce the size of buffering, and/or the amount of processing required in the conversion.

The invention provides a method of converting an input data stream having a Program Stream (PS) format into an output data stream having a Transport Stream (TS) format, the method comprising:
(a) reading from said input data stream successive blocks of data, said input data stream including data of first and second elementary data streams formed and multiplexed in compliance with a PS decoder model;
(b) accumulating the data of the first and second elementary streams respectively in first and second queue structures;
(c) establishing a TS target decoder model including hypothetical first and second buffers for the first and second elementary streams respectively;
(d) generating a succession of transport packets to form said output data stream conveying said first and second data streams in said TS format, by reference to said target decoder model; and
(e) updating the status of said hypothetical first and second buffers within said TS target decoder in response to each transport packet generated and predetermined properties of said decoder model;
wherein each transport packet comprises data from either the first queue, the second queue or neither queue, depending on the scheduling of said elementary streams within the input data stream and on the state of said first and second buffers within said TS target decoder model, and wherein the method includes inhibiting reading of a further data block from said stream when, in the absence of a vacancy for data of said second elementary stream within the target decoder model, a clock reference of said input data stream advances beyond a clock reference of said output data stream by a predetermined waiting threshold.

The invention further provides a method wherein in the PS format at least said first and second elementary streams of data have been encoded, divided into elementary stream packets with packet headers, and the packets interleaved whole, while in the TS format such elementary stream packets are further sub-divided into a plurality of smaller transport packets, and the transport packets of the first and second elementary streams interleaved with each other and with transport packets carrying data from neither stream.

In embodiments of the invention described herein the subdivision of each elementary stream into elementary stream packets is the same in the input and output streams.

In embodiments of the invention the TS format data stream may be of constant data rate, said transport packets being of uniform size and period.

In embodiments of the invention the input stream can be read in blocks, each block containing at least one whole elementary stream packet, and only packets from one elementary stream.

In embodiments of the invention each block may contain a PS delivery time code, a TS transport time code being advanced with the generation of each transport packet and being synchronised initially with the PS delivery time code.

In one embodiment of the invention the PS and TS formats define constraints as to:
(i) maximum time difference ("skew") between delivery times for respective presentation units in the first and second elementary streams having a common presentation time;
and at least one of:
(ii) capacity for buffering data of each elementary stream between delivery and decoding; and
(iii) rate of delivery of data of each elementary stream on the scale of one access unit from the transport stream to a buffer for decoding.

In a particular embodiment the buffer constraint (ii) is stricter in the TS format than in the PS format for the second elementary stream, and said waiting threshold is sufficient to accommodate a quantity of excess data corresponding to the difference between what can be accommodated within the buffer in the PS target decoder and what can be accommodated in the TS target decoder.

In another embodiment said minimum rate constraint (iii) is stricter in the TS format than in the PS format for the second elementary stream, and said waiting threshold is sufficient to allow extra time for transport of an access unit within the second elementary stream, the extra time corresponding to the difference between the shortest possible time for delivery of such an access unit within the PS format constraint and the longest possible time for delivery of the same access unit within the TS format constraint.

The PS and TS formats may permit different coding parameters to be implemented in said second elementary stream so as to vary one or both of the quantity of data to be delivered and the presentation period for each access unit, while said waiting threshold is fixed in accordance with a maximum extra time required among the permitted coding parameters.

In specific embodiments of the invention described herein the waiting threshold can be less than one fifth the skew permitted in the program stream.

In a particular embodiment the access unit comprises a compressed audio frame.

The invention further provides a method of re-multiplexing first and second elementary streams of data so as to generate a continuous stream of transport packets complying with a second predetermined target decoder model, the data of said first and second streams having been previously multiplexed in compliance with a different, first predetermined target decoder model, wherein said data is read on demand from an input channel and the reading of said data is constrained by reference to progress in re-multiplexing of the second elementary stream irrespective of a vacancy for data of the first stream in the second target decoder model, provided that said reading is judged sufficiently far in advance of the progress in re-multiplexing the second elementary stream to compensate for differences in the first and second target decoder models.

In one embodiment of the invention each of the first and second target decoder models defines for each elementary stream a respective buffer of finite size for data to be decoded, and wherein at least for the second elementary stream the buffer is smaller in the TS target decoder than in the PS target decoder.

In an embodiment of the invention the average data rate of the first elementary stream is substantially greater than that of the second elementary stream.

In particular embodiments described herein the data of the first elementary stream comprises encoded video pictures and the data of the second elementary stream comprises encoded audio frames.

The invention further provides methods of converting an input data stream having a Program Stream (PS) format into an output data stream having a Transport Stream (TS) where the TS format is compliant with the MPEG-2 Transport Stream specification, while said PS format is compliant with the MPEG-2 Program Stream specification, both as defined in ITU-T Recommendation H.222.0 and 150/IEC 13818.1.

The invention provides a method reproducing a recorded audio-visual programme wherein a data stream in PS format is read from a data channel, converted to a TS format by a method as described above and fed via a further channel to an TS-compatible decoder.

In one embodiment of the invention the channel comprises a recording of said input data stream on a record carrier.

The invention further provides apparatus comprising means specifically adapted for implementing any of the methods according to the invention set forth above. Such apparatus may for example form part of a stand-alone decoder apparatus (set-top box), a presentation apparatus (such as a TV set) or a recording and reproducing apparatus (digital VCR).

Other features and advantages of the invention beyond those identified above and many variations and modifications of the same invention will become clear to the skilled reader from a consideration of the following description of specific embodiments.

BRIEF DESCRIPTION OF THE DRAWINGS

Embodiments of the invention will now be described, by way of example only, by reference to the accompanying drawings, in which:

FIG. 2 illustrates the format of data in a transport stream (TS) format;

DETAILED DESCRIPTION OF THE EMBODIMENTS

Example System

Figure 1:
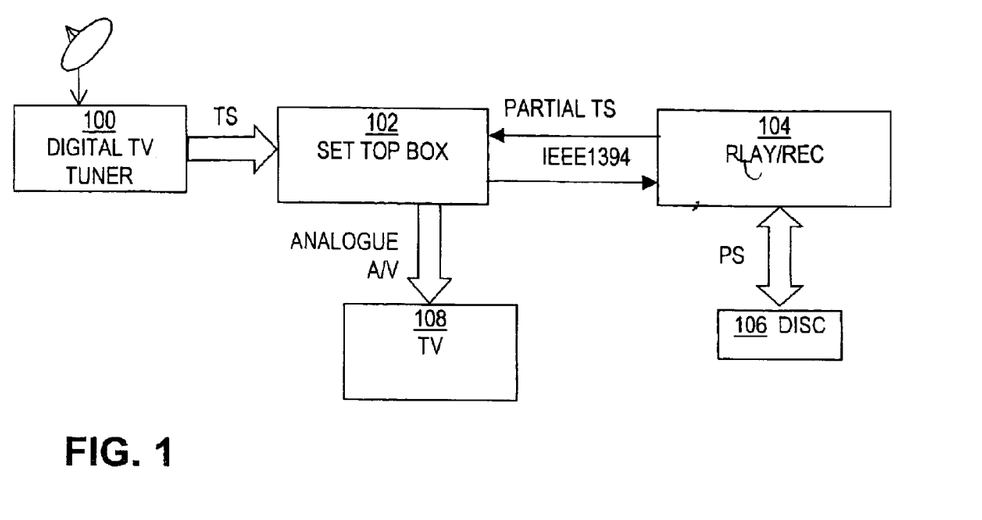
FIG. 1 illustrates an example digital video entertainment system in which an embodiment of the invention is applied.

FIG. 1 illustrates an example home digital video entertainment system, including a digital TV tuner 100, a "set top box" 102 for decoding digital video signals, controlling access to pay channels and so forth, a digital video playback and recording device 104 such as a well-known optical disc video system or future DVR recorder, and the storage medium itself (disc 106). In this example, a conventional analogue TV set 108 is used in this configuration for displaying pictures from a satellite, cable or terrestrial broadcast, or from a recording on disc 106. Between the digital tuner 100 and the set top box 102, MPEG-compatible transport stream (TS) format signals carry a number of digital TV channels, some of which may be scrambled for decoding with special conditional access (pay TV) arrangements. The standard digital broadcast formats, for example DVB, ATSC and ARIB, are specific applications within the MPEG-2 transport stream format.

Set top box 102 also decodes a desired programme from within the transport stream TS, to provide analogue audio and video signals to the TV set 108. These analogue signals can of course be recorded by a conventional video recorder (VCR). On the other hand, for maximum quality and functionality, the direct digital-to-digital recorder such as the well-known optical disc video system or DVR recorder 104 is preferred. This is connected to the set top box via a digital interface such as IEEE1394 ("Firewire"). This carries a "partial TS" in which the selected programme is separated from the larger TS multiplex, and presented still within the TS format. On the other hand, to take advantage of the improved directory structure and random-access features, the player/recorder 104 is arranged to convert the TS format into PS format for recording on the disc 106, and to convert PS format streams recorded on disc 106 into partial TS format for playback, via the digital interface and set top box 102, on the TV 108.

The present description relates primarily to the process of conversion from Program Stream (PS) format to Transport Stream (TS) format, while conversion in the other direction is the subject of our current pending application entitled "Method and Apparatus for Converting Data Streams" and claiming priority from United Kingdom patent application no. 9930788.6 filed Dec. 30, 1999 (PHB 34446). Before examining in detail the techniques applied for efficient conversion between these formats, the two formats will be described in more detail with reference to FIGS. 2 and 3.

Transport Stream (TS) Format

FIG. 2 illustrates the key features and structure of the MPEG-2 Transport Stream (TS) format. The Transport Stream TS is a continuous stream of transport packets labelled T-PKT in the drawing, each comprising 188 bytes of data, and having the format shown at the top of the figure. Full details of the MPEG-2 Transport Stream, including Syntax, semantics and constraints applicable, will be found in ITU-T recommendation H.262|ISO/IEC 13818-2. Information about the MPEG-2 system is available online at http://www.mpeg.org. Briefly, each transport packet includes a header portion and a payload portion, the payload being indicated as bytes DAT-0 to DAT-N in the figure. The header begins with a distinctive synchronisation byte SYNC followed by various flags and control fields including a transport error indicator TEI, a payload unit start indicator USI, a transport priority indicator TPI, a packet identification PID, transport scrambling control field TSC, adaptation field control AFC and continuity counter CC. Depending on the contents of field AFC, there may be present an adaptation field AF, occupying some of the space otherwise allocated to payload data.

In the example of the DVB digital broadcast format, the data rate of the TS Stream is around 40 (Mbits/s), while the typical data rate for an audio visual programme is less than 10 Mbits/s. Accordingly, as shown at TS in FIG. 2, various programmes PROG1, PROG3 can be multiplexed into a single transport stream. The field PID of each transport packet indicates one elementary stream to which that packet relates, these being interleaved in units of transport packets with plentiful other streams. One programme may for example comprise of a video stream (PID='005' in the example), an audio stream (PID='006') and teletext data stream (PID='007'). The correspondence between PID values and programmes, and the type of data carried with each PID is maintained in the form of programme specific information (PSI) tables. Periodically within the transport stream a programme association table PAT is carried in a special stream of transport packets with PID=0. The PAT in turn indicates for PROG1, PROG3 etc., which stream carries a programme mapping table PMT, which lists completely the different PID values relating to the single programme, and describes the content of each one (video, audio, alternative language audio, etc.). These tables and other data for control purposes are referred to herein as system information.

To reproduce or record a given programme (PROG1) from the transport stream, the payload DAT-0 to DAT-N of successive transport packets having that PID is concatenated into a stream, and this stream carries packetised elementary stream packets PES-PKT, which are further defined in the MPEG-2 specification. Each PES packet begins with a distinctive packet start code prefix PSCP. Next in the PES packet header is a stream identifier SID which identifies the type of elementary stream (for example video, audio, padding stream or private stream). PES packets do not have a fixed length unless specified in a particular application, and a PES packet length field LEN specifies the number of bytes in the PES packet. Various control and flag fields C&F then follow, including for example a data alignment indicator DAI and a header length field HLEN. Various optional fields are then present within the header HDAT, depending on the value of associated flags in the C&F field for example, a presentation time stamp PTS may be present specifying the time with reference to a system clock at which a "presentation unit" picture, audio frame etc.) beginning in the present PES packet is due to be presented. In certain cases, presentation units are decoded in a different order from their presentation order, in which case a decoding time stamp DTS may also be present.

The payload PY-0 to PY-N of successive PES packets having the same SID forms a continuous elementary stream of data shown schematically at ES in FIG. 2. In the case of a video elementary stream ES-VIDEO, various picture sequences of clips SEQ are present, each including at its start a sequence header SEQH. Various parameters of the decoder including quantisation matrices, buffer sizes and the like are specified in the sequence header. Accordingly, correct playback of the video stream can only be achieved by starting the decoder at the location of a sequence header. Within the data for each sequence are one or more "access units" of the video data, each corresponding to a picture (field or frame depending on the application). Each picture is preceded by a picture start code PSC. A group of pictures GOP may be preceded by a group start code GSC, all following a particular sequence header SEQH.

As is well known, pictures in MPEG-2 and other modern digital formats are encoded by reference to one another so as to reduce temporal redundancy. Motion compensation provides an estimate of the content of one picture from the content already decoded for a neighbouring picture or pictures. Therefore a group of pictures GOP may comprise: an intra-coded "I" frame, which is coded without reference to other pictures; "P" (predictive) coded pictures which are coded using motion vectors based on a preceding I frame; and bidirectional predicted "B" pictures, which are encoded by prediction from I and/or P frames before and after them in sequence. The amount of data required for a B picture is less than that required for a P picture, which in turn is less than that required for an I picture. On the other hand, since the P and B pictures are encoded only with reference to other pictures, it is only the I pictures which provide an actual entry point for starting playback of a given sequence. Furthermore, it will be noted that the GOP data, the I and P pictures are encoded before the corresponding B pictures, and then re-ordered after decoding so as to achieve the correct presentation order. Accordingly, B and P pictures are examples where the presentation time stamp PTS and decoding time stamp DTS may differ.

Finally in FIG. 2 there is shown a representation of an audio elementary stream ES-AUDIO. This comprises simple frames of data FRM with frame start codes. Various audio formats are permitted, varying in terms of sample rate (32 kHz, 48 kHz etc.) and also data rate (for example 32 kbits per second, or variable). These and other properties of the audio and video streams are encoded in the programme specific information PSI and in the PES packet headers.

Audio frames and video pictures having the same presentation time stamp PTS are those which are to be presented simultaneously at the output of the decoder. On the other hand, there is great freedom in the scheduling of packets of data from the different elementary streams, such that audio and video access units having the same PTS value can arrive in the transport stream TS up to one second apart.

Program Stream (PS) Format

Figure 3:
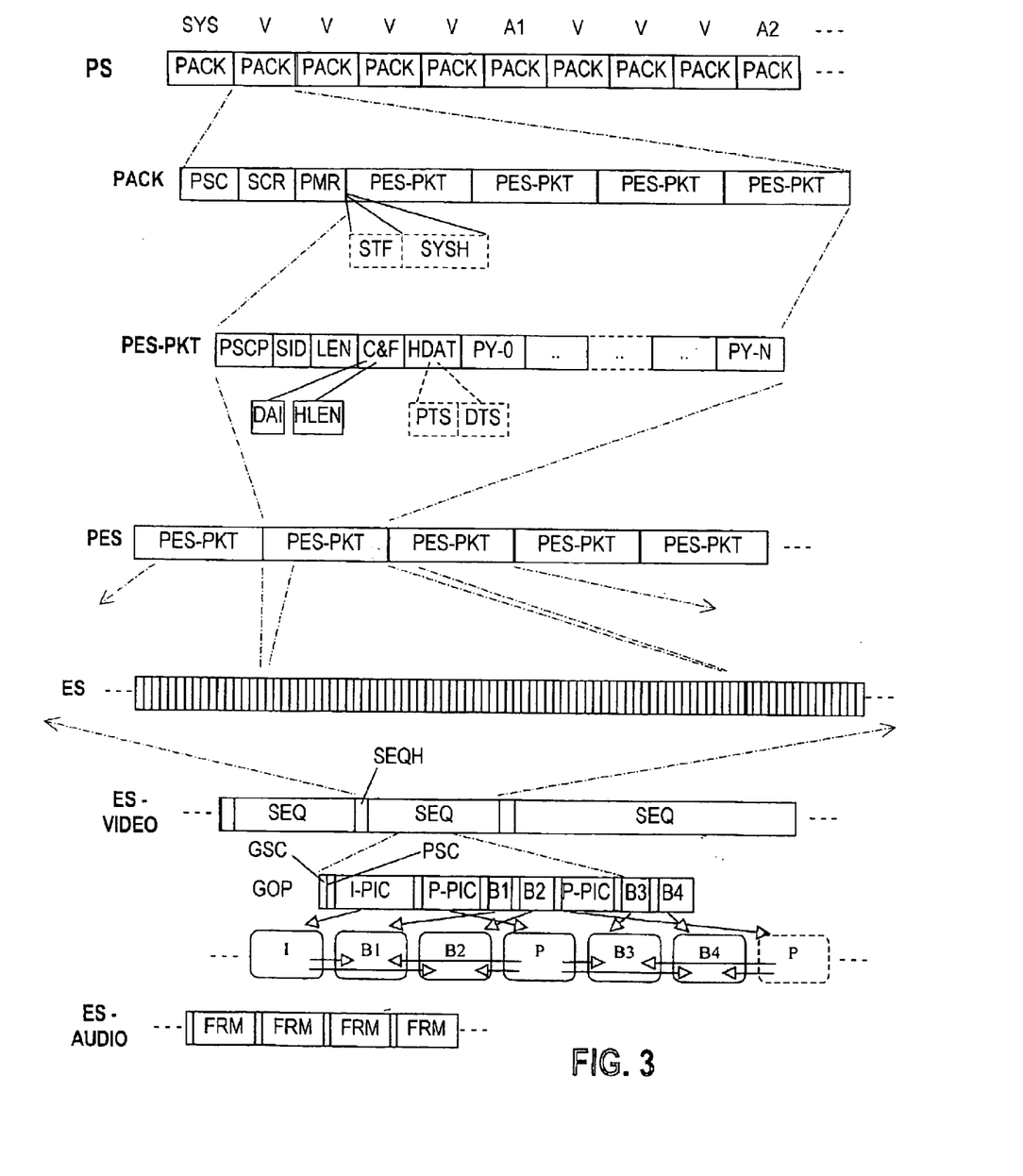
FIG. 3 illustrates the format of data in a program stream format.

FIG. 3 illustrates the other major format type specified for MPEG-2 signals, the program stream (PS). Shown at the top of the Figure, PS conveys the same elementary streams ES-VIDEO and ES-AUDIO as the transport stream illustrated in FIG. 2, and again in the form of PES packets PES-PKT. The program stream is not so finely divided and packetised as TS, and generally carries only the streams required for a single presentation. Entire PES packets PES-PKT are packed in groups of one or more into program stream packs PACK with a basic header comprising a distinctive pack start code PSC, a system clock reference time stamp SCR and a indication PMR of the programme_mux_rate, that is the bit rate a which the program stream PS is intended to be presented to a decoder. A typical programme_mux_rate, for example in the well-known optical disc video system specification, is 10.08 Mbits/s. Optionally, a program stream pack includes stuffing STF and a system header SYSH. As illustrated at the top in FIG. 3, before any video packs V or audio stream packs A1, A2 etc. are transmitted, the program stream begins with an extensive system header, specifying various parameters of the coding and the decoders, a directory of sequence headers and their positions for example on a disc or other storage medium carrying the program stream, in order for the decoder to be set up properly for the decoding of a specific programme. Since there is no transport packet structure with PID codes, the stream identifier SID in the PES packets of the program stream specifies the type of elementary stream carried in the given PES packet, and also if necessary which one of several streams of that type (audio 1, audio2 etc.) is carried, so that the correct ones may be found and presented to the decoder. The system information in the system header SYSH provides further description.

Applications such as well-known optical disc video system specify that each pack in the program stream carries only PES packets of one program stream, and indeed typically a single PES packet is carried per pack. In the case of storage on an optical disc or similar recording medium, each PES pack generally corresponds to one retrieval unit or "sector" of the disc filing structure. In general, MPEG-2 standard allows different types and numbers of PES packet to be mixed within each pack, and the pack size may be permitted to vary in other applications.

System Target Decoders

In order to ensure that buffering and other aspects of a real decoder are able to decode each type of stream without breaks in the presented audio-visual programme, the MPEG-2 standard specifies a transport stream "system target decoder" (T-STD) model and a program stream system target decoder (P-STD) model. Broadly, each system target decoder is a model of a hypothetical real decoder having means for de-multiplexing the different elementary streams of the TS or PS format, having decoders for each of the audio, video and system control types of data, and having buffers between the incoming stream and the decoder for holding data of each energy stream between its arrival from a data channel and its actual time of decoding and presentation.

T-STD and P-STD are both similar in general form, as explained more fully in the MPEG-2 specification. However, differences between the T-STD and the P-STD mean that, in general, a transport stream cannot be mapped directly to a program stream without re-scheduling at least at the level of PES packets, and similarly for conversation from PS to TS format. As one example, the audio decoder in TS format has a smaller buffer than in the P-STD. As another example, each main buffer in the T-STD is preceded by a transport buffer which acts to smooth the rather "bursty" data in the transport stream itself. While data for a given stream may arrive in a burst of several transport packets at a peak rate of 40 megabits per second, the average rate of such a stream, when taking into account the entire transport stream multiplex, is far lower. A "leak rate" is defined for the transport buffer so as to throttle the incoming data to a rate of 2 megabits per second, assuming that there is data to be passed into the main buffer.

Conversion from Program Stream to Transport Stream

Figure 4:
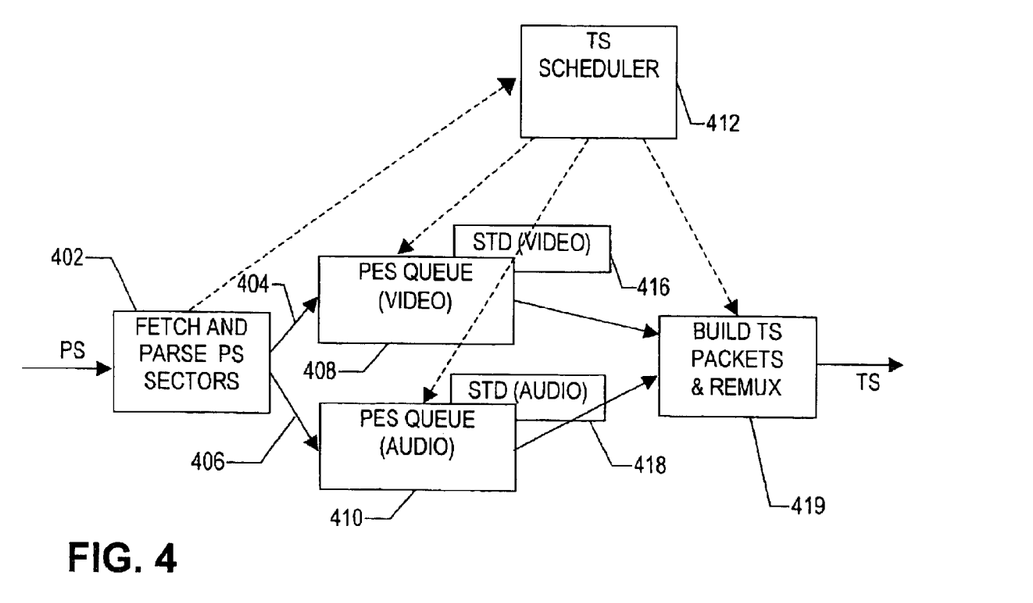
FIG. 4 shows the key data paths and functional blocks in converting a PS format signal to TS format, in accordance with an embodiment of the invention.

FIG. 4 illustrates the basic approach to transmultiplexing from the Program Stream of well-known optical disc video system playback to a DVB standard Transport Stream required by the digital TV decoder 102 in the example application of FIG. 1. Well-known optical disc video system program streams are divided into PES packets that fit into 2048 byte sectors (PS packs). Each sector starts with a Pack header, carrying the SCR of the pack. Each Pack carries one PES packet of a single data type and optionally a stuffing packet. (A well-known optical disc video system stream carrying MPEG-2 audio is an exception—base and extension packets may be interleaved within a pack.)

Parsing well-known optical disc video system PES packets is very simple. The well-known optical disc video system PES packet structure can be maintained throughout the transmultiplexing process because the well-known optical disc video system constraints on PES packet structure are more severe than the constraints imposed by DVB on the Transport Stream to be generated (similarly ATSC etc.). On the other hand, it will be understood that the techniques disclosed herein can be applied with appropriate adaptation to MPEG-2 compatible streams generally, and to packetised elementary streams of data carried in other formats having similar properties.

In overview, the input well-known optical disc video system stream PS (from disc 106 in the example of FIG. 1) is parsed at 402 and split into parallel streams of PES packets of each data type stream_identifier SID (video stream 404, audio stream 406). Graphics streams included in the well-known optical disc video system multiplex are not specifically considered here as they are either to be transcoded into MPEG video or "burnt into" the picture data of the main same video stream, in order to appear in the decoded picture. In principle, however, further streams of graphics and/or other types of information may also be present, and treated in similar manner to the audio and video streams illustrated. The parallel A/V PES streams each enter a queue (buffer) 408, 410 respectively. Under control of a scheduler 412 the queued data streams are then divided at 414 into 188-byte Transport packets (T-PKT) and interleaved to form the transport stream TS, that are then scheduled and sent to the player output interface.

While the key functional components and processes of the transmultiplexer are shown and described as separate blocks, it will be appreciated that the various buffers and processes described herein may be implemented in a general purpose processor and a shared memory, used also for other purposes of the player 104 or other apparatus. Equally, specialised digital signal processors and/or dedicated hardware can be used at appropriate points, according to normal design considerations.

The scheduler 412 will now be described in more detail. An initial idea would be to maintain the same data scheduling as is used in the Program Stream, which is assumed to be compliant with the PS requirements. In this case the elementary data would be transported in the Transport Stream as nearly as possible at the same time as it is transported in the Program Stream. This would have the advantage of saving the need for a full remultiplex in which MPEG STD (System Target Decoder) models have to be maintained and large buffers provided. Unfortunately at least two constraints in MPEG-2 make it impossible simply to apply the same schedule from the PS to the TS, while remaining compliant with the TS format:

The TS audio buffer size is 3584 bytes. In the well-known optical disc video system Program Stream it is 4096 bytes, implying that the set top decoder buffer for audio data might overflow from time to time, and audio samples would be lost.

The TS audio STD model has a maximum instantaneous rate of 2 Mbits/s defined by the "leak rate" of the transport buffer. This can only be exceeded for 512 bytes. The well-known optical disc video system PS allows a maximum audio bit rate of 10.08 Mbits/s (defined by "program_mux_rate") to be sustained for a duration of 4096 bytes (two packets). Accordingly, the well-known optical disc video system multiplex can deliver a longer burst of data, at a higher rate, than the MPEG-2 Transport Stream (TS) can convey.

These two limitations suggest that it is essential to separate and remultiplex the elementary streams, and to reschedule the data according to the different constraints imposed on the output stream. Referring again to FIG. 4, accordingly, scheduler 412 maintains models 416 and 418 of the system target decoder (T-STD) specified for each elementary stream in TS format. It will be understood that these models do not actually store or decode the stream data. However, by establishing various counters and lists and updating these over time in accordance with the behaviour specified in the MPEG-2 System standard, the model tracks the hypothetical movement of data, in particular to ensure that stream buffers in a compatible real decoder will not over-flow or under-flow, so that data will not be lost, and will always be available in time and in the correct sequence for decoding and presentation to the user. To this end, a TS System Clock is the key timebase for the remultiplex function, synchronised with the constant generation of the transport stream. The incoming program stream carries its own System Clock Reference (SCR), both expressed in terms of a 27 MHz clock. TS packets are generated every TS packet period. They can in principle be generated exactly when required, or may be fed into a short FIFO buffer to relax timing constraints on the actual scheduling and generation of the packets. The current value of the System Clock for the purposes of the following description is the time of the TS packet currently being generated, irrespective of any subsequent buffering delay.

To maintain the STD models 416, 418 for the elementary streams the scheduler also knows the size of each access unit, and certain parameters for the video (frame rate, repeat first field flag, picture type etc.) in order to calculate the PTS/DTS for access units that do not have it explicitly coded in the PES packet headers. Note that the well-known optical disc video system, for example only requires explicit coding, in the PES headers, of PTS/DTS on the first I-picture in every GOP. It is not mandatory, and not common, that PTS/DTS is encoded for every picture. Similarly it may be advantageous to have parameters for the audio stream (sample rate, frame size etc.)

Therefore, although the contents of the PES packets are not disturbed (except for example to re-map the SID/PID to a convenient programme structure), it is necessary to parse the elementary data in all active streams down to the Picture Header/Extension/frame header level. Note that these are contained at arbitrary byte locations in PES packets and therefore the start codes may be even be split between PES packets. The audio may be variable bit-rate. Also, whereas the various start codes in the video stream are unique in the MPEG-compatible bit stream, the audio sync codes can with a small probability be emulated in the audio payload data. Parsing the audio stream therefore requires a state machine approach to confirm synchronisation over several frames, rather than a simple scan for a unique bit pattern.

Scheduler 412: Method 1

There is now described a first example process ("Method 1") for determining when to send TS packets, and from which elementary stream. This process can apply when the Program Stream can be read faster than real time, from a disc for example. It can also apply when the PS must be handled in real-time, for example as it is delivered over an interface, but in this case the re-multiplexer inserts a delay of up to 1 s. Method 1 has the advantage over Method 2 (FIG. 6, see below) of being simpler, but uses more memory for intermediate queues and requires more delay if the PS is delivered in real-time.

Figure 5:
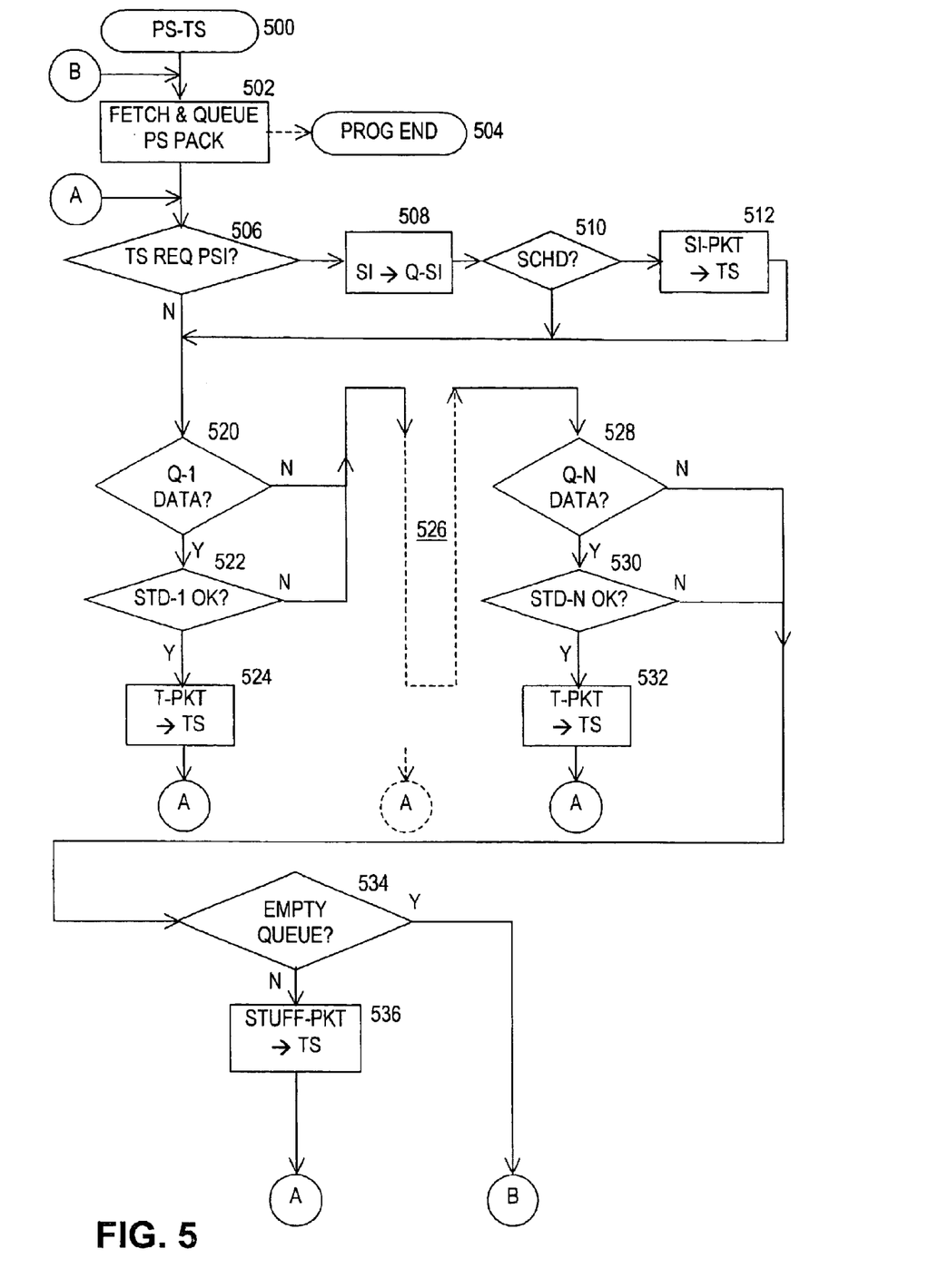
FIG. 5 illustrates a hypothetical scheduling process which does not exploit knowledge of the input stream constraints.

FIG. 5 shows the scheduler process in the form of a flowchart. A main loop of this flowchart is executed at least once for every TS packet period, and in practice the main loop or sub-processes within it may be repeated several times in each TS period. The conversion process starts at step 500 and continues with the following steps.

502: Read a sector (PS Pack) from the Program stream. This is parsed to identify SID and PES length. The data is discarded if SID indicates that it is not wanted. Note that in general MPEG-2 permits plural PES packets and even plural SID within each pack. The (or each) PES packet is sent intact to the appropriate queues (408, 410 in FIG. 4). Connector B leads to step 502, for use whenever a new sector is to be read from the PS.

504: Naturally the process ends when there are no more PS packs to be read (this may be indicated in advance by the directory structure on the disk).

506: From the headers and optional system fields in the streams, in the PES packets, it is determined whether system information (SI in the well-known optical disc video system, PSI in MPEG-2 terms) needs to be inserted in the TS for proper control of the decoder. If so, at 508 SI data is added to an SI queue (not shown in FIG. 4). At 510 it is checked whether there is space for SI data in a SI buffer of the hypothetical decoder, according to the current state of the STD. If so, at 512 a Transport packet is generated accordingly. If not, the process continues with the SI data still in the queue.

520: Entering now the main loop, which is executed continually to generate Transport packets, a first queue is examined to determine there is data ES waiting in the relevant queue. In the present example, it is preferred that the audio stream be examined first, although all streams will be examined in turn.

522: Assuming that there is data waiting to be sent for the first ES, the system target decoder model is checked to see whether the buffer for this stream can accept a further Transport packet. If so, at 524 a Transport packet is added to the output stream. Connector A leads to the start of the main loop again.

526: If no packet has been generated from the first queue (because the queue was empty, or the relevant STD buffer 416/418 was full), steps similar to steps 520–524 are repeated for each elementary stream, checking the respective queue for data, checking the fullness of the corresponding buffer in the STD model, and sending a Transport packet if possible. Once a packet has been generated, control returns to the top of the main loop via connector A. Steps for the last stream are shown at 528–532.

534: If none of the streams has been able to schedule a transport packet, a check is made to see whether any of the queues is empty. If there is an empty stream, connection B is followed to fetch a new sector of data from the input stream.

536: Is none of the queues is empty, the conclusion is that all buffers of the STD are full, and a "wait" action is effected by writing a stuffing (empty) packet to the transport stream. It will be remembered that the TS format comprises packets at a fixed rate, whether data is there for them or not, and the occurrence of stuffing packets to "pad out" the wanted data will be quite regular. Stuffing packets are defined within the MPEG-2 specification for this purpose, and are discarded upon receipt by the decoder. By the same token, stuffing packets have no effect on buffer fullness in the decoder model STD. control passes then to step 520 and the process repeats, waiting and stuffing as necessary until one of the buffers has space for a new transport packet.

Note that the first stream (audio in the embodiment) receives a kind of priority, in the scheme illustrated by FIG. 5. That is to say, so long as the first queue has data and the first buffer has space in the STD, transport packets from that stream will be sent in preference to other streams. The inventors have chosen to implement such a priority in the present example, because the number of streams is limited and scheduling in the audio stream decidedly has the least freedom. The exact algorithm is not critical, however, and other options can be envisaged to suit different circumstances. For example, to maximise the interleaving of data from different streams of similar characteristics, it is only necessary to change the connection form step 524 to lead to step 526 instead of looping back to A, and so on for subsequent streams until the last one. That way, only when all streams have been tried, and a packet sent where possible, will the loop be made to step 520, and the first stream tried again. The same considerations apply in relation to Method 2, described below.

Method 1 Analysis

The above scheduling algorithm fetches another PS packet whenever one of the elementary stream queues is empty. This means that the TS scheduler 412 always has an unlimited choice of elementary data to find a packet that will fit the TS multiplex constraints. The PS packet scheduling then has no impact on the TS multiplex schedule.

Since there is no dependency between the input stream schedule and the output stream schedule, and we know that a TS multiplexer can always find a valid schedule, it is clear that this algorithm has no dead-lock conditions. The price for this simplicity is buffering, however, and in cases where the PS cannot be read faster than real-time, a transcoding delay of about 1 s. The "worst case" for queue occupancy and buffering delay will be when there is a maximum skew between the elementary streams.

Consider for example one audio stream and one video stream. Suppose a particular audio frame, N, is delivered by the PS very late just-in-time before its decoding time DTS), and the previous audio frame of the same stream (N–1) is delivered very early. The TS scheduler will insert frame N–1 into the transport stream TS some time after it arrives in the transmultiplexer. It will then not schedule any packets at all, neither audio nor video, until audio frame N is read from the PS. All the video frames in between will be fetched, however, and have to be queued in the transmultiplexer.

The worst case queue length and the delay can be derived for this situation using the MPEG "one second rule". This rule says the maximum decoding delay for any access unit (e.g. for frame N–1) is 1 s. Thus 1 s is the maximum possible time between delivery of frame N–1 and frame N (a marginally tighter bound can be derived). Therefore 1 s is an upper bound on the delay, and can be used to calculate queue lengths. A buffer of at around 230 kbytes is thus required for 1 s of video stream, nearer to 300 kbytes in pratice.

Scheduler 412: Method 2

Figure 6:
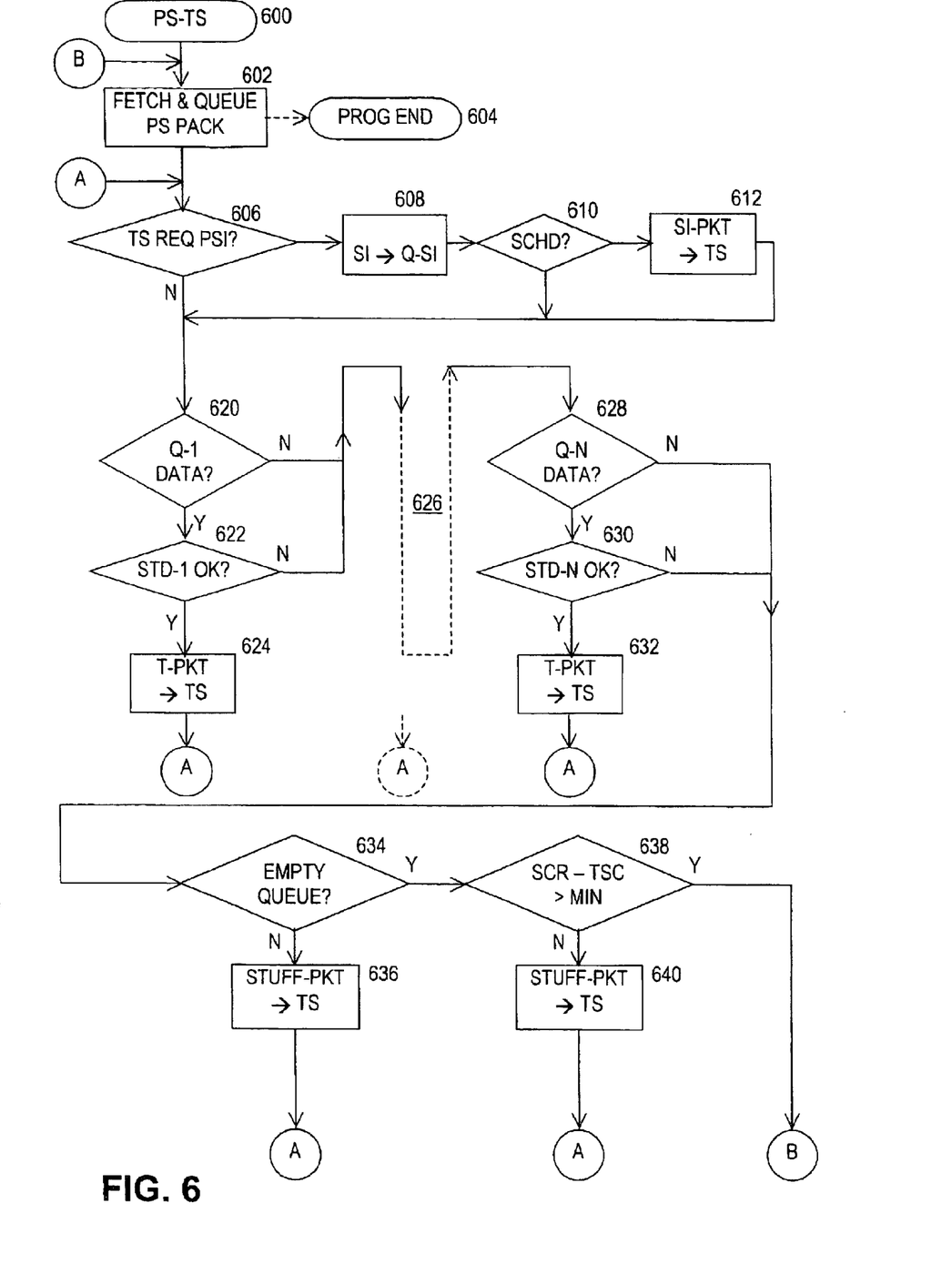
FIG. 6 illustrates a scheduling method in accordance with an embodiment of the invention.

FIG. 6 shows a modified procedure for scheduling the transport stream, with less buffer requirement. The procedure at steps 600–634 is the same as steps 500–534 in FIG. 5 (Method 1). However, the modified method effectively uses the knowledge that the input stream is a Program Stream with a legal PS multiplex schedule to introduce a dependency between the two schedules and hence reduce the delay.

The new step is at 638, which compares the System Clock Reference (SCR) value (included in the last fetched PS pack), with the system clock TSC. Remember that TSC indicates progress in the generation of the transport stream, while SCR indicates progress in the fetching of the input stream PS. Whereas in Method 1 new data is fetched from the input stream whenever any of the queues is found empty, the extra step at 638/640 permits new data to be fetched only if SCR is less than a predetermined threshold MIN ahead of TSC. In other words, even if there is an empty queue buffer, new data will not be fetched so long as the input stream has been read ahead by a sufficient amount. Note that TSC is advancing all the time, even with the generation of stuffing packets, whereas SCR only advances as and when new data is fetched from the input straem PS (disc). If the time difference MIN in step 638 can be set substantially less than the 1 s maximum delay permitted by MPEG-2, we can see immediately that the buffering required for the queues will become proportionately smaller. Effectively it means that in the example above that we can send many video packets while we are waiting for the next audio frame.

In the example of converting a well-known optical disc video system-compatible MPEG-2 program stream to a transport stream, there are two reasons for rescheduling the packets, as mentioned already. One is the 2 Mbits/s limitation on the leak rate of the audio transport buffer in a Transport Stream. The other is the difference in the sizes of the main audio buffer between Transport Streams and Programs Streams (3584 vs 4096 bytes). If we examine these two cases, we can see how much freedom the TS packet scheduler needs in order to find a compliant schedule, given that the input is a compliant program stream.

Assume that the audio is 48 kHz MPEG with a frame duration of 24 ms. The skilled reader will readily see how to generalise the argument for other assumptions such as different sample rate, or AC3 encoding so long as the frame size is known. The well-known optical disc video system allows MPEG audio bit-rates to lie between 32 kbits/s and 448 kbits/s. At 32 kbits/s—the access unit size (size of a compressed frame) is 0.024×32000/8=96 bytes. At 448 kbits/s—the access unit size (size of a compressed frame) is 0.024×448000/8=1344 bytes.

The well-known optical disc video system program_mux_rate (the rate at which a single frame is delivered in the input stream) is 10.08 Mbits/s. The TS audio TB buffer leak rate is 2 Mbits/s (Rleak). In the worst case this represents the maximum rate at which an audio frame can be transported by the TS multiplex. Consider each of the two cases separately:

2 Mbits/s TB Limitation

Consider audio frame N of maximum size Bn (1344 bytes) delivered by the PS at the latest possible time—just before its decoding time—DTSn. The first byte of frame N will be delivered in the PS at:

$$Tps<=DTSn-Bn/(Rmux)$$

In the worst case it can take at least deltaTts=(Bn/Rleak) to send this frame in the Transport Stream. So, the first byte of the frame must be sent at:

$$Tts=DTSn-\text{delta}Tts.$$

The Program stream must be buffered in the transmultiplexer for at least (Tts–Tps) seconds to give the scheduler the freedom it needs to solve this problem.

Considering the well-known optical disc video system values mentioned above, $$Bn/Rleak=1344/(2\times 10^6/8)=5.376 \text{ ms}$$

$$Bn/Rmux=1344/(10.08\times 10^6/8)=1.067 \text{ ms}$$

Therefore the minimum transmultiplex delay required to give scheduling freedom from this constraint is 4.31 ms.

Buffer Size Difference

Consider a program stream that has a packet schedule that exactly fill the PS audio buffer at some time. Because the TS audio buffer is smaller it is not possible to transmit some of these audio frames immediately. They must be delayed until the TS audio buffer has emptied enough to allow them to be scheduled. To maintain A/V sync and to avoid underflow in other streams, all streams must be delayed by the same time.

The difference in buffer size is 4096–3584 bytes=512 bytes. This represents the worst case (longest time) when the data rate is lowest. When the data rate is 32 kbits/s the frame size is 96 bytes. 512/96=5.33 frames, which is rounded up to six frames as the entire frame must be present in the buffer at the frame's decoding time according to the MPEG model. Six frames represents 144 ms.

Thus to give the TS scheduler freedom to overcome this constraint, we need to impose a delay of 6 audio frames (144 ms), which also exceeds the constraint of 4.31 ms suggested by the leak rate limitation. Roughly speaking, then, Method 2 allows the rescheduling of the PES packets from PS to TS format with around one sixth of the delay that would be expected from a consideration of the constraints of the TS format alone. The delay of 144 ms can be reduced somewhat if the input stream can be read into the transmultiplexer in less than real time.

Note in this case that the priority given to the audio stream (first stream in the flowchart, but corresponding to the "second stream" in the introduction and claims) is important to ensure that the delay of 144 ms will be used when necessary to meet the constraints identified. On the other hand, different algorithms may be used to provide the necessary priority, while allowing other streams to take priority when their own progress becomes more critical. A scheme which assigns priority to the stream whose STD buffer has the lowest percentage fullness might be equally valid. A looser rigid priority scheme might be applied together with upward scaling of the waiting threshold to provide measured additional freedom.

What is claimed is:

1. A method of converting an input data stream having a Program Stream (PS) format into an output data stream having a Transport Stream (TS) format, the method comprising:
   (a) reading from said input data stream successive blocks of data, said input data stream including data of at least first and second elementary data streams formed and multiplexed in compliance with a PS decoder model;
   (b) accumulating the data of the first and second elementary streams respectively in first and second queue structures;
   (c) establishing a TS target decoder model including hypothetical first and second buffers for the first and second elementary streams respectively
   (d) generating a succession of transport packets to form said output data stream conveying said first and second data streams in said TS format, by reference to said target decoder model; and
   (e) updating the status of said hypothetical first and second buffers within said TS target decoder in response to each transport packet generated and predetermined properties of said decoder model;
   wherein each transport packet comprises data from either the first queue, the second queue or neither queue, depending on the scheduling of said elementary streams within the input data stream and on the state of said first and second buffers within said TS target decoder model, and wherein the method includes inhibiting reading of a further data block from said stream when, in the absence of a vacancy for data of said second elementary stream within the target decoder model, a clock reference of said input data stream advances beyond a clock reference of said output data stream by a predetermined waiting threshold.

2. A method as claimed in claim 1 wherein in the PS format at least said first and second elementary streams of data have been encoded, divided into elementary stream packets with packet headers, and the packets interleaved whole, which in the TS format such elementary stream packets are further sub-divided into a plurality of smaller transport packets, and the transport packet of the first and second elementary streams interleaved with each other and with transport packets carrying data from neither stream.

3. A method as claimed in claim 2 wherein the subdivision of each elementary stream into elementary stream packets is the same in the input and output stream.

4. A method as claimed in claim 1 wherein the TS format data stream is of constant or piecewise constant data rate, said transport packets being of uniform size and period.

5. A method as claimed in claim 1 wherein the input stream is read in blocks, each block containing at least one whole elementary stream packet, and only packets from one elementary stream.

6. A method as claimed in claim 1 wherein each block contains a PS delivery time code, and wherein a TS transport time code is synchronized initially with the PS delivery time code and advanced with the generation of each transport packet.

7. A method as claimed in claim 1 wherein each of the PS and TS formats defines constraints as to: (ii) an upper bound on the maximum time difference ("skew") between delivery times for respective presentation units in the first and second elementary streams having a common presentation time; and at least one of (ii) capacity for buffering data of each elementary stream between delivery and decoding; and (iii) rate of delivery of data of each elementary stream on the scale of one access unit from the transport stream to a buffer for decoding.

8. A method as claimed in claim 7 wherein said buffer constraint (ii) is stricter in the TS format than in the PS format for the second elementary stream, and wherein said waiting threshold is sufficient to accommodate a quantity of excess data corresponding to the difference between what can be accommodated within the buffer in the PS target decoder and what can be accommodated in the TS target decoder.

9. A method as claimed in claim 7 wherein said minimum rate constraint (iii) is stricter in the TS format than in the PS format for the second elementary stream and wherein said waiting threshold is sufficient to allow extra time for transport of an access unit within the second elementary stream, the extra time corresponding to the difference between the shortest possible time for delivery of such an access unit within the PS format constraint and the longest possible time for delivery of the same access unit within the TS format constraint.

10. A method as claimed in claim 9 wherein said PS and TS formats permit different coding parameters to be implemented in said second elementary stream so as to vary one or both of the quantity of data to be delivered and the presentation period for each access unit, and wherein said waiting threshold is fixed in accordance with a maximum extra time required among the permitted coding parameters.

11. A method as claimed in claim 7 wherein said waiting threshold is less than one fifth of the skew permitted in the program stream.

12. A method as claimed in claim 7 wherein said access unit comprises a compressed audio frame.

13. A method as claimed in claim 1 wherein the average data rate of the first elementary stream is substantially greater than that of the second elementary stream.

14. A method as claimed in claim 1 wherein data of the first elementary stream comprises encoded video pictures and the data of the second elementary stream comprises encoded audio frames.

15. A method as claimed in claim 1 wherein said TS format is compliant with the MPEG-2 Transport Stream specification, while said PS format is compliant with the MPEG-2 Program Stream specification, both as defined in ITU-T Recommendation H.222.0 and ISO/IEC 13818-1.

16. A method of reproducing a recorded audio-visual programme wherein a data stream in PS format is read from a data channel, converted to a TS format by a method as claimed in claim 1 and fed via a further channel to an TS-compatible decoder.

17. A method of re-multiplexing first and second elementary streams of data so as to generate a continuous stream of transport packets complying with a second predetermined target decoder model comprising, reading data of said first and second stream that have been previously multiplexed in compliance with a different, first predetermined target decoder model, wherein said data is read on demand from an input channel and the reading of said data is constrained by reference to progress in re-multiplexing of the second elementary stream irrespective of a vacancy for data of the first stream in the second target decoder model, judging said reading sufficiently far in advance of the progress in re-multiplexing the second elementary stream to compensate for differences in the first and second target decoder models.

18. A method as claimed in claim 17 wherein each of the first and second target decoder models defines for each elementary stream a respective buffer of finite size for data to be decoded, and wherein at least for the second elementary stream the buffer is smaller in the TS target decoder than in the PS target decoder.

19. A method as claimed in claim 17 wherein the average data rate of the first elementary stream is substantially greater than that of the second elementary stream.

20. A method as claimed in claim 17 wherein data at the first elementary stream comprises encoded video pictures and the data of the second elementary stream comprises encoded audio frames.

21. A method as claimed in claim 17 wherein said TS format is compliant with the MPEG-2 Transport Stream specification, while said PS format is compliant with the MPEG-2 Program Stream specification, both as defined in ITU-T Recommendation H.222.0 and ISO/IEC 13818-1.

22. A method of reproducing a recorded audio-visual programme wherein a data stream in PS format is read from a data channel, converted to a TS format by a method as claimed in claim 17 and fed via a further channel to an TS compatible decoder.

23. A method as claimed in claim 22 wherein said data channel comprises a recording of said input data stream an a record carrier.

24. An apparatus comprising means for receiving an input data stream in a first format wherein at least two elementary streams of data are multiplexed and means for converting the data to a second format to generate an output stream, said converting means comprising means specifically adapted to implement a method as claimed in claim 1.

25. An apparatus as claimed in claim 24, the apparatus comprising one of a stand-alone decoder apparatus for digital video programmes, a presentation apparatus having a display for video programmes, and a reproducing apparatus for playing and optional also for recording digital video programmes.

26. An apparatus comprising means for receiving an input data stream in a first format wherein at least two elementary streams of data are multiplexed and means for converting the data to a second format to generate an output stream, said converting means comprising means specifically adapted to implement a method as claimed in claim 17.

27. An apparatus as claimed in claim 26, the apparatus comprising one of a stand-alone decoder apparatus for digital video programmes, a presentation apparatus having a display for video programmes, and a reproducing apparatus for playing and optional also for recording digital video programmes.

* * * * *